(12) United States Patent
Santee et al.

(10) Patent No.: US 9,355,667 B1
(45) Date of Patent: May 31, 2016

(54) DATA STORAGE DEVICE SAVING ABSOLUTE POSITION AT EACH SERVO WEDGE FOR PREVIOUS WRITE OPERATIONS

(71) Applicant: Western Digital Technologies, Inc., Irvine, CA (US)

(72) Inventors: Nathan J. Santee, Mission Viejo, CA (US); Yanan Huang, Torrance, CA (US); Wei Xi, Mission Viejo, CA (US); Hien T. Chu, Fountain Valley, CA (US); Orhan Beker, Dove Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/538,610

(22) Filed: Nov. 11, 2014

(51) Int. Cl.
G11B 5/596 (2006.01)
G11B 21/02 (2006.01)

(52) U.S. Cl.
CPC .................................. G11B 5/59655 (2013.01)

(58) Field of Classification Search
None
See application file for complete search history.

(56) References Cited

U.S. PATENT DOCUMENTS

| | | | |
|---|---|---|---|
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,111,714 A * | 8/2000 | Ueda et al. | 360/60 |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,493 B1 | 1/2001 | Wakefield | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,215,608 B1 | 4/2001 | Serrano et al. | |
| 6,243,223 B1 | 6/2001 | Elliott et al. | |
| 6,281,652 B1 | 8/2001 | Ryan et al. | |
| 6,285,521 B1 | 9/2001 | Hussein | |

(Continued)

OTHER PUBLICATIONS

Daniel J. Gunderson, et al., U.S. Appl. No. 13/246,600, filed Sep. 27, 2011, 17 pgs.

(Continued)

*Primary Examiner* — K. Wong (57) ABSTRACT

A data storage device is disclosed comprising a head actuated over a disk comprising a plurality of tracks defined by servo sectors, wherein each servo sector comprises a plurality of servo bursts and the servo sectors define a plurality of servo wedges. A first write operation is executed to a first track and a first absolute position for the head is generated corresponding to a first servo wedge. A second write operation is executed to a second track and a second absolute position for the head is generated corresponding to the first servo wedge. An off-track write condition is detected when executing the second write operation based on the first absolute position and the second absolute position. The first absolute position comprises a track address of the first track and a position error measurement based on the servo bursts in the first servo wedge.

28 Claims, 10 Drawing Sheets

(56) References Cited

U.S. PATENT DOCUMENTS

| | | |
|---|---|---|
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,421,197 B1 | 7/2002 | Abdelnour |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,320 B1 | 12/2002 | Liu |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,717,757 B1 | 4/2004 | Levy et al. |
| 6,724,564 B1 | 4/2004 | Codilian et al. |
| 6,731,450 B1 | 5/2004 | Codilian et al. |
| 6,735,033 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,781,780 B1 * | 8/2004 | Codilian ............... 360/60 |
| 6,788,483 B1 | 9/2004 | Ferris et al. |
| 6,791,785 B1 | 9/2004 | Messenger et al. |
| 6,795,262 B1 | 9/2004 | Codilian et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,489 B1 * | 4/2005 | Brunnett et al. ........ 360/60 |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,940,679 B1 | 9/2005 | McNeil et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,968,422 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,468 B1 * | 12/2005 | Melrose et al. ........ 360/31 |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,097,110 B2 | 8/2006 | Sheperek et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,305 B2 | 4/2007 | Chan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |

(56) References Cited

U.S. PATENT DOCUMENTS

| | | |
|---|---|---|
| 7,391,584 B1 | 6/2008 | Sheh et al. |
| 7,423,828 B2 * | 9/2008 | Emo et al. .................. 360/60 |
| 7,426,086 B2 * | 9/2008 | Tobari et al. ................ 360/53 |
| RE40,545 E * | 10/2008 | Ioannou et al. ......... 360/77.06 |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,474,491 B2 | 1/2009 | Liikanen et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,545,593 B1 | 6/2009 | Sun et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,625,215 B1 * | 1/2014 | Burd et al. .................... 360/31 |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |

(56) References Cited

U.S. PATENT DOCUMENTS

| | | |
|---|---|---|
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2004/0109253 A1 | 6/2004 | Nishiyama et al. |
| 2007/0139809 A1 | 6/2007 | Liikanen et al. |
| 2010/0035085 A1 | 2/2010 | Jung et al. |
| 2010/0265611 A1 | 10/2010 | Jun |
| 2012/0162806 A1 | 6/2012 | Champion et al. |
| 2012/0284493 A1 | 11/2012 | Lou et al. |
| 2012/0307400 A1 | 12/2012 | Kawabe |
| 2013/0120870 A1 | 5/2013 | Zhou et al. |
| 2013/0148240 A1 | 6/2013 | Ferris et al. |

OTHER PUBLICATIONS

Wei Xi , et al., U.S. Appl. No. 13/911,365, filed Jun. 6, 2013, 20 pages.
Office Action dated Apr. 24, 2014 from U.S. Appl. No. 13/911,365, 15 pages.
Notice of Allowance dated Sep. 9, 2012 from U.S. Appl. No. 13/911,365, 46 pages.

* cited by examiner

DATA STORAGE DEVICE SAVING ABSOLUTE POSITION AT EACH SERVO WEDGE FOR PREVIOUS WRITE OPERATIONS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
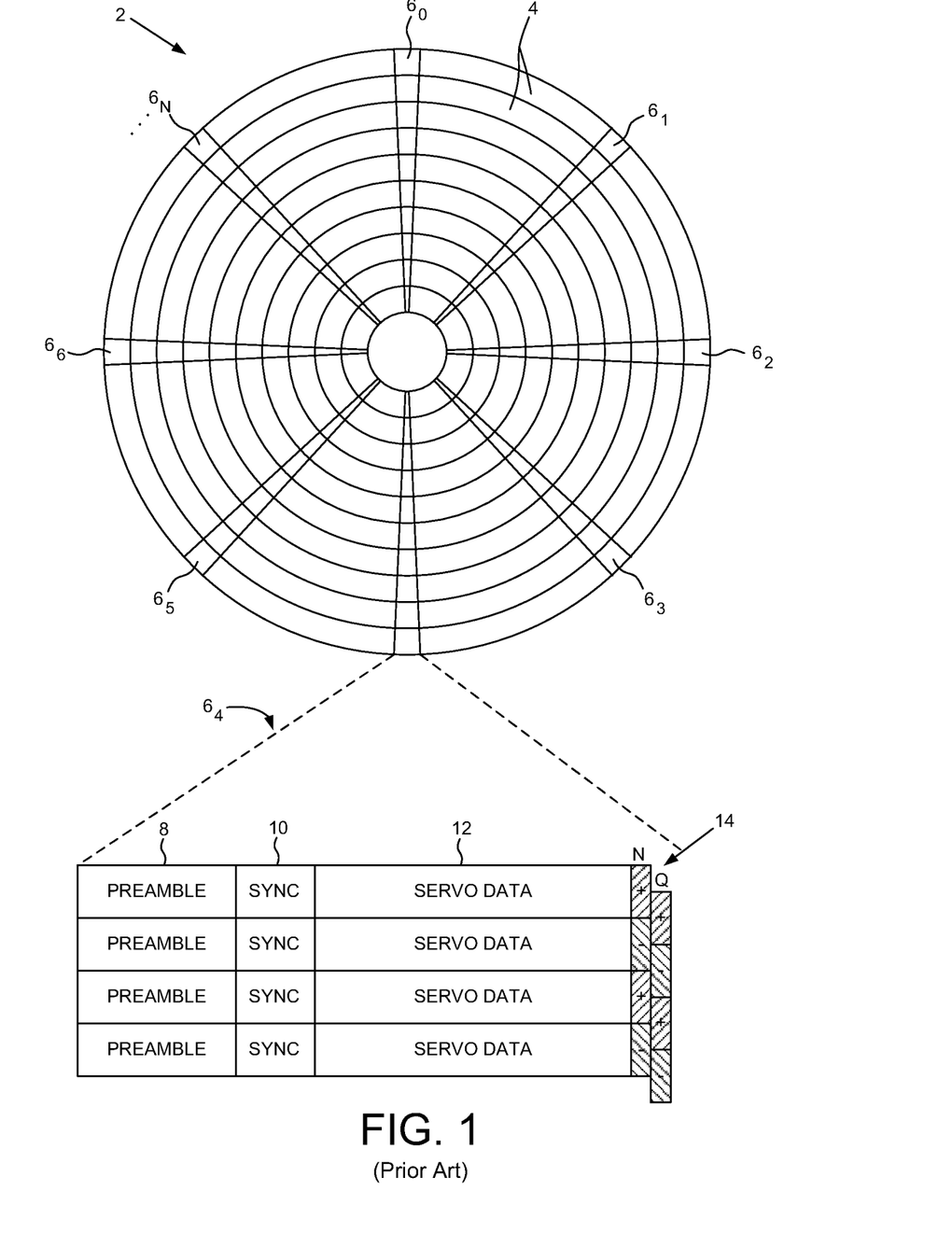
FIG. 1 shows a prior art disk format comprising a plurality of tracks defined by servo sectors that form servo wedges.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
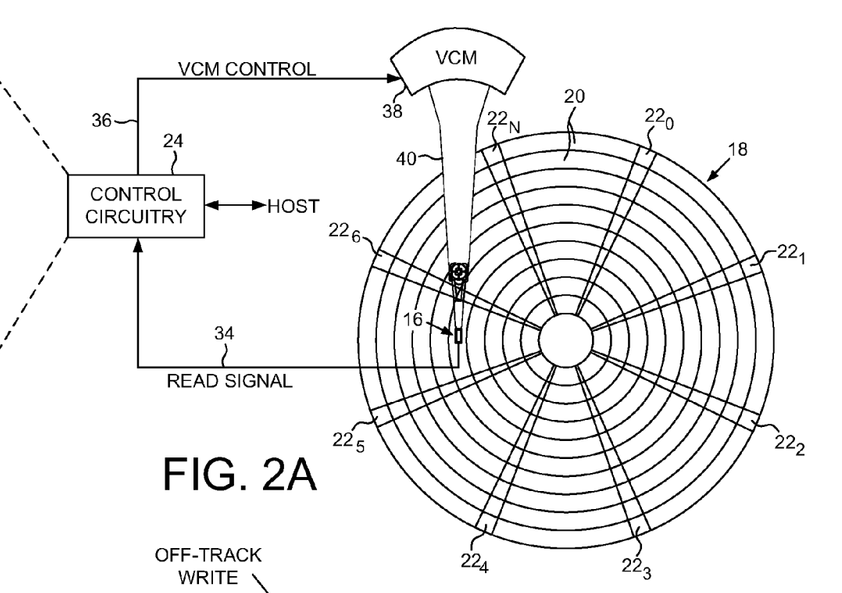
FIG. 2A shows a data storage device in the form of a disk drive according to an embodiment comprising a head actuated over a disk comprising a plurality of tracks defined by servo sectors, wherein each servo sector comprises a plurality of servo bursts and the servo sectors define a plurality of servo wedges.
Figure 2B:
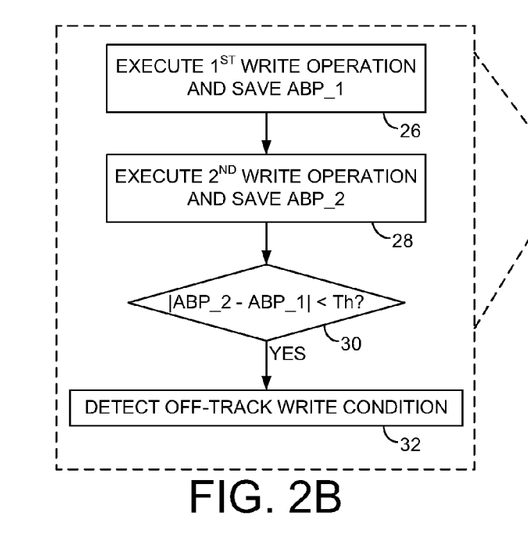
FIG. 2B is a flow diagram according to an embodiment wherein an absolute position of the head is evaluated to detect an off-track write condition.

FIG. 2A shows a data storage device in the form of a disk drive according to an embodiment comprising a head 16 actuated over a disk 18 comprising a plurality of tracks 20 defined by servo sectors $22_0$-$22_N$, wherein each servo sector comprises a plurality of servo bursts and the servo sectors $22_0$-$22_N$ define a plurality of servo wedges. The disk drive further comprises control circuitry 24 configured to execute the flow diagram of FIG. 2B, wherein a first write operation is executed to a first track and a first absolute position for the head is generated corresponding to a first servo wedge (block 26). A second write operation is executed to a second track and a second absolute position for the head is generated corresponding to the first servo wedge (block 28). An off-track write condition is detected (block 32) when executing the second write operation based on the first absolute position and the second absolute position (block 30). The first absolute position comprises a track address of the first track and a position error measurement based on the servo bursts in the first servo wedge.

In the embodiment of FIG. 2A, the servo sectors $22_0$-$22_N$ define a plurality of servo tracks, wherein data tracks are defined relative to the servo tracks at the same or different radial density. The control circuitry 24 processes a read signal 34 emanating from the head 16 to demodulate the servo sectors $22_0$-$22_N$ and generate a position error signal (PES) representing an error between the actual position of the head and a target position relative to a target track. The control circuitry 24 filters the PES using a suitable compensation filter to generate a control signal 36 applied to a voice coil motor (VCM) 38 which rotates an actuator arm 40 about a pivot in order to actuate the head 16 radially over the disk 18 in a direction that reduces the PES. The servo sectors $22_0$-$22_N$ may comprise any suitable head position information, such as a track address for coarse positioning and servo bursts for fine positioning. The servo bursts may comprise any suitable pattern, such as an amplitude based servo pattern or a phase based servo pattern.

Figure 2C:
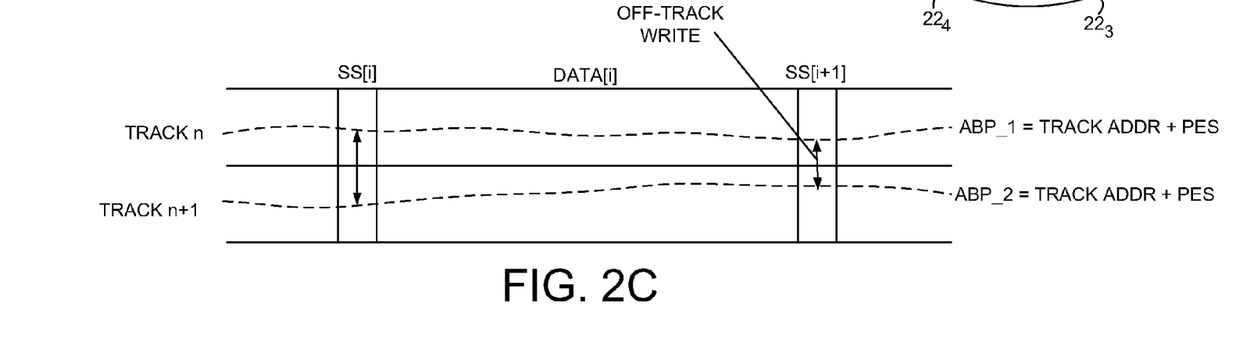
FIG. 2C illustrates an off-track write condition detected based on the absolute positions of adjacent track writes according to an embodiment.

During a write operation, the head 16 may deviate from the center of the target track resulting in an off-track write condition. In one embodiment shown in FIG. 2C, the off-track write condition is detected relative to the absolute position of the head 16 when writing a current track n+1 and the absolute position of the head 16 when writing a previous track n. For example, if the difference between the absolute positions is less than a threshold at block 30 of FIG. 2B, then an off-track write condition is detected. Referring to the example of FIG. 2C, an off-track write condition is not detected at servo wedge SS[i] whereas an off-track write condition is detected at servo wedge SS[i+1]. In one embodiment, in order to detect the off-track write condition, the absolute position of the head when writing the adjacent track n is saved in a position buffer. In one embodiment, the position buffer stores an absolute position corresponding to each servo wedge so that if the entire track n is written, then each entry of the position buffer is updated with the absolute position generated at each servo wedge. In one embodiment, write operations may be executed to non-adjacent tracks (including partial tracks) such that the position buffer may store the absolute position for each servo wedge that may correspond to different, non-adjacent tracks.

Figures 3A, 3B:
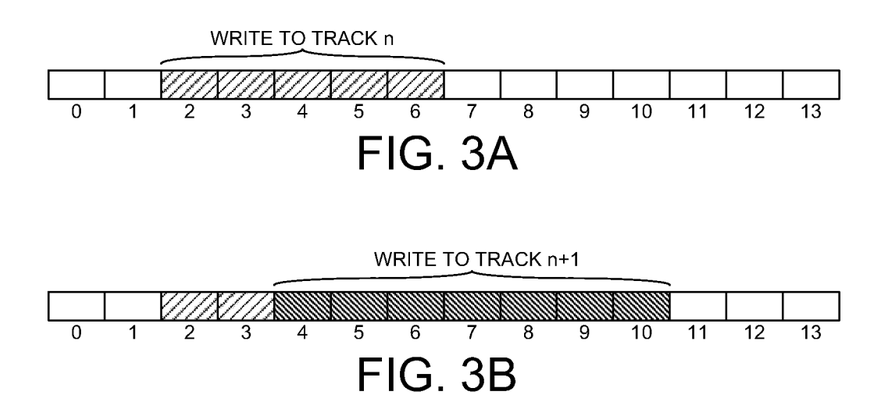
FIGS. 3A-3D illustrate an embodiment wherein the absolute position of the head at each servo wedge during write operations is saved in a position buffer representing a circumference of the disk.

An example of this embodiment is illustrated in FIGS. 3A-3D which illustrate how the position buffer may be updated when executing a number of write operations. This example shows the disk 18 may comprise 14 servo wedges (0-13); however, the disk 18 may comprise any suitable number of servo wedges. FIG. 3A shows a first write operation to a first track n, wherein the first write operation spans servo wedges 2-6 and therefore a corresponding absolute position generated at servo wedges 2-6 is stored in the position buffer. FIG. 3B shows a second write operation to a second, adjacent track n+1, wherein the second write operation spans servo wedges 4-10 and therefore a corresponding absolute position generated at servo wedges 4-10 is stored in the position buffer. In this example, the absolute position previously stored in the position buffer for servo wedges 4-6 when executing the first write operation (FIG. 3A) are overwritten with the absolute position generated for servo wedges 4-6 during the second write operation (FIG. 3B).

When executing the second write operation, the absolute position generated at servo wedge 4 may be compared to the absolute position saved in the position buffer in order to detect an off-track write condition. If the off-track write condition is not detected, the absolute position generated at servo wedge 4 during the second write operation may replace the absolute position previously stored in the position buffer. In an alternative embodiment, the absolute position generated at each servo wedge during the second write operation may be stored in a scratch buffer. If the second write operation completes successfully without detecting an off-track write condition, then the absolute position values stored in the scratch buffer may replace the absolute position values stored in the position buffer. This embodiment may facilitate rewriting one or more of the data wedges during a retry write operation if an off-track write condition is detected.

Figure 3C:
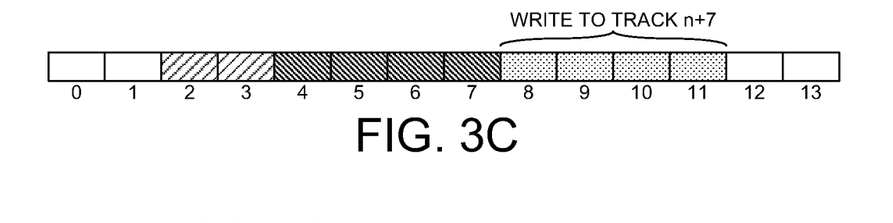
Figure 3D:
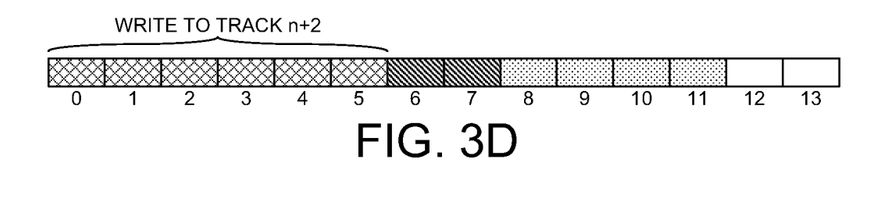

FIG. 3C shows a third write operation to a third, non-adjacent track n+7 (non-adjacent to track n+1), wherein the third write operation spans servo wedges 8-11 and therefore a corresponding absolute position generated at servo wedges 8-11 is stored in the position buffer. When executing the third write operation, the difference between the absolute position stored in the position buffer for servo wedge 8 (which corresponds to writing track n+1) and the absolute position generated for the third write operation will be very large since the third track n+7 is non-adjacent with the previously written track n+1. Therefore an off-track write condition based on the absolute position stored in the position buffer will not be detected. During the fourth write operation to track n+2 as shown in FIG. 3D, an off-track write condition may be detected for servo wedges 4-5 since the absolute position stored in the position buffer corresponds to adjacent track n+1. Accordingly, in this embodiment the position buffer stores an absolute position for each servo wedge around the circumference of the disk; however, the absolute positions stored in the position buffer may correspond to different (potentially non-adjacent) tracks. A benefit provided by this embodiment is that an off-track write condition may be detected based on the absolute position of the head during the write operations without having to store the absolute position for every track written. Further, by storing the absolute position (as compared to just storing the PES for each servo wedge) in the position buffer, the case where the written tracks are non-adjacent is automatically taken into account.

Figure 8:
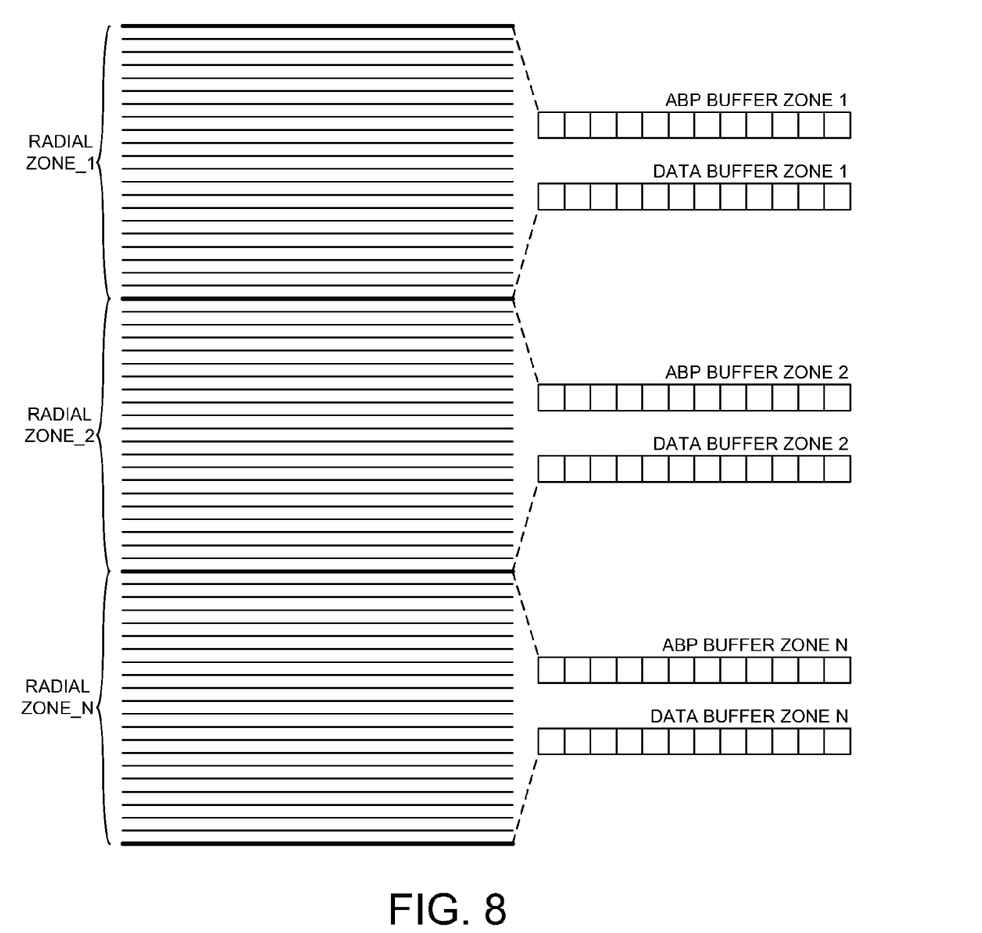
FIG. 8 shows an embodiment wherein the disk is divided into a number of radial zones, wherein each radial zone is tracked using a position buffer and a data buffer.

In one embodiment shown in FIG. 8, the disk may be divided into a number of radial zones, wherein a separate position buffer (ABP buffer) may be maintained for each radial zone. This embodiment may improve the chances of detecting an off-track write condition since the content of each position buffer will more likely correspond to an adjacently written track. For example, in one embodiment one or more of the radial zones may correspond to a "shingled zone" wherein the tracks may be written as a circular buffer using log structured writes. In this embodiment, the tracks of a "shingled zone" are written consecutively such that the corresponding position buffer will typically comprise the absolute position information of an adjacent, previously written track. Even in radial zones where the writes may not always be consecutive, at least part of the position buffer may store absolute position information of a previously written, adjacent track such that an off-track write condition may be detected using the position buffer as described above.

In the embodiment described above, the absolute position may comprise a track address and a position error measurement based on the servo bursts in the servo wedge. In another embodiment, the absolute position may further include a head number corresponding to the disk surface being written in a multi-disk surface disk drive. In this embodiment, an off-track write condition may be detected based on the absolute position stored in the position buffer when writing to the same disk surface.

Figure 4:
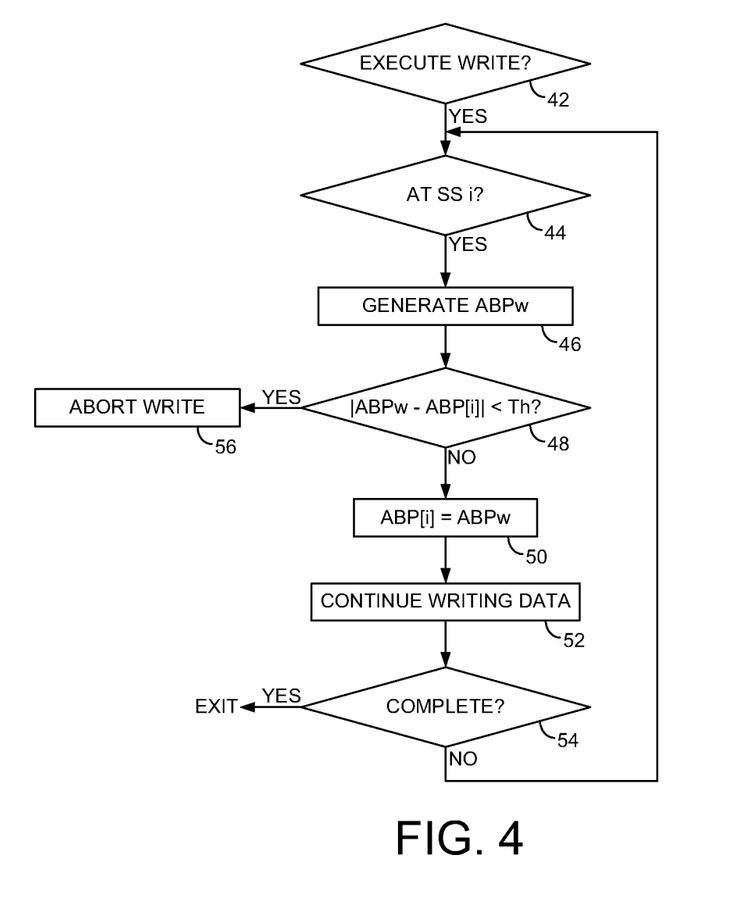
FIG. 4 is a flow diagram according to an embodiment wherein the position buffer is updated based on a current write operation.

FIG. 4 is a flow diagram according to an embodiment for executing a write operation (block 42), wherein when the head reaches servo sector i (block 44) an absolute position ABPw is generated (block 46) corresponding to the servo wedge. A difference between the absolute position ABPw and the corresponding absolute position ABP[i] stored in the position buffer is compared to a threshold (block 48). If the difference is greater than the threshold, then an off-track-write condition is not detected and the absolute position ABPw is stored in the position buffer at ABP[i] (block 50). The write operation then continues (block 52) until the write operation finishes (block 54) or until an off-track write condition is detected at block 48. If it is not completed at block 54, the next servo sector is processed (increments i) and the process returns to block 44. In the embodiment of FIG. 4, when an off-track write condition is detected at block 48, the write operation is aborted (block 56). In an alternative embodiment, the absolute positions generated at block 46 may be saved in a scratch buffer, and the content of the scratch buffer copied to the position buffer after the write operation has successfully completed. This embodiment may facilitate a retry write operation when a write operation is aborted due to detecting an off-track write condition.

Figure 5:
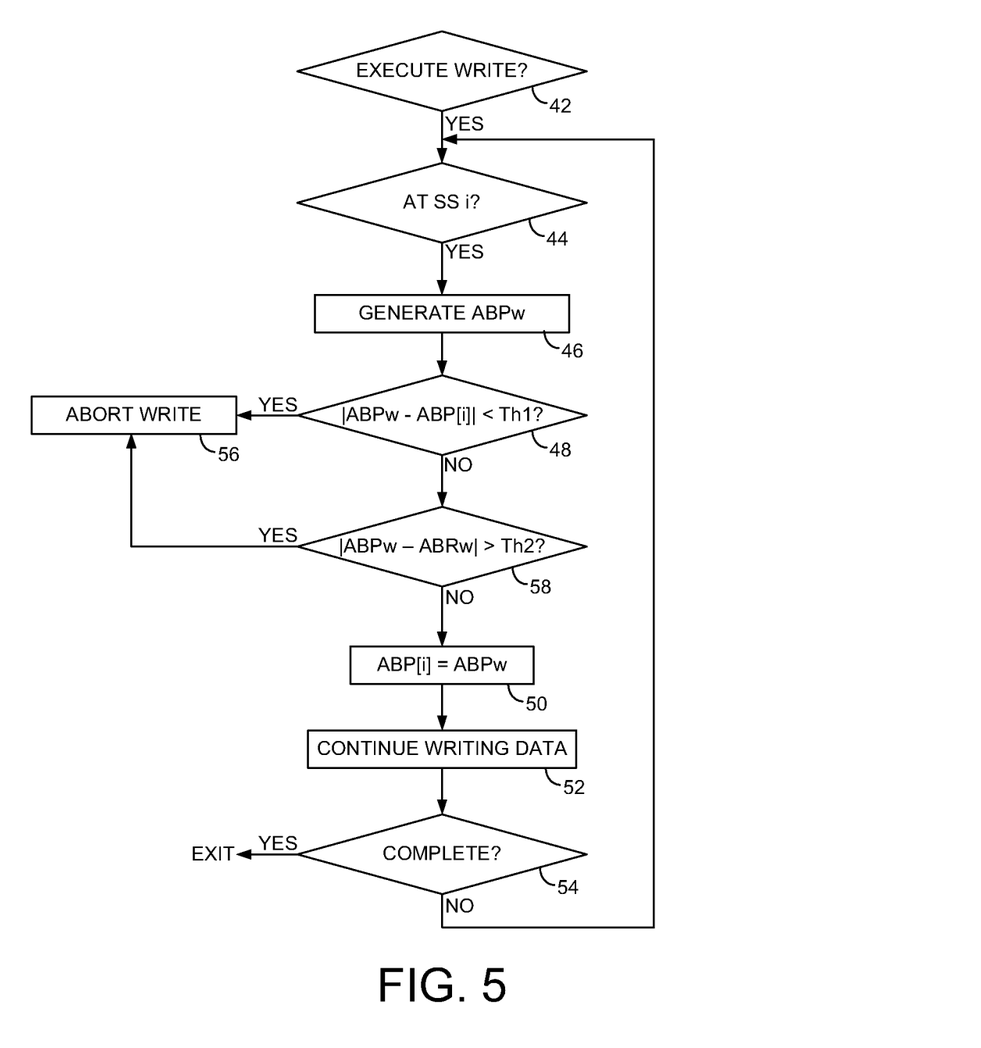
FIG. 5 is a flow diagram according to an embodiment wherein an off-track write condition may be detected based on the absolute position of the head and an absolute reference position.

FIG. 5 is a flow diagram according to an embodiment which extends on the flow diagram of FIG. 4, wherein when an off-track write condition is not detected at block 48 based on the position buffer, an off-track write condition may still be detected at block 58 if the absolute position ABPw deviates sufficiently from a reference absolute position (ABRw) which corresponds to the center of the track being written. That is, if the difference between the absolute position ABPw and the reference position ABRw exceeds a threshold (block 58) an off-track write condition is detected and the write operation is aborted at block 56.

In one embodiment, the control circuitry 24 of FIG. 2A is configured to define a data buffer corresponding to a circumference of the disk. When a first write operation is executed to write first write data to a first track, the first write data is stored to a first part of the data buffer. When second write operation is executed to write second write data to a second track, at least part of the second write data is stored to a second part of the data buffer. When a third write operation is executed to write third write data to a third track, at least part of the third write data is stored to a third part of the data buffer. The data buffer simultaneously stores at least part of the first write data, the second write data, and the third write data, wherein the third track is non-adjacent to the first track. An example of this embodiment may be understood with reference to FIGS. 3A-3D described above, except that each block of the buffer corresponds to a data wedge of a write operation rather than an absolute position generated for each servo wedge.

Figure 6:
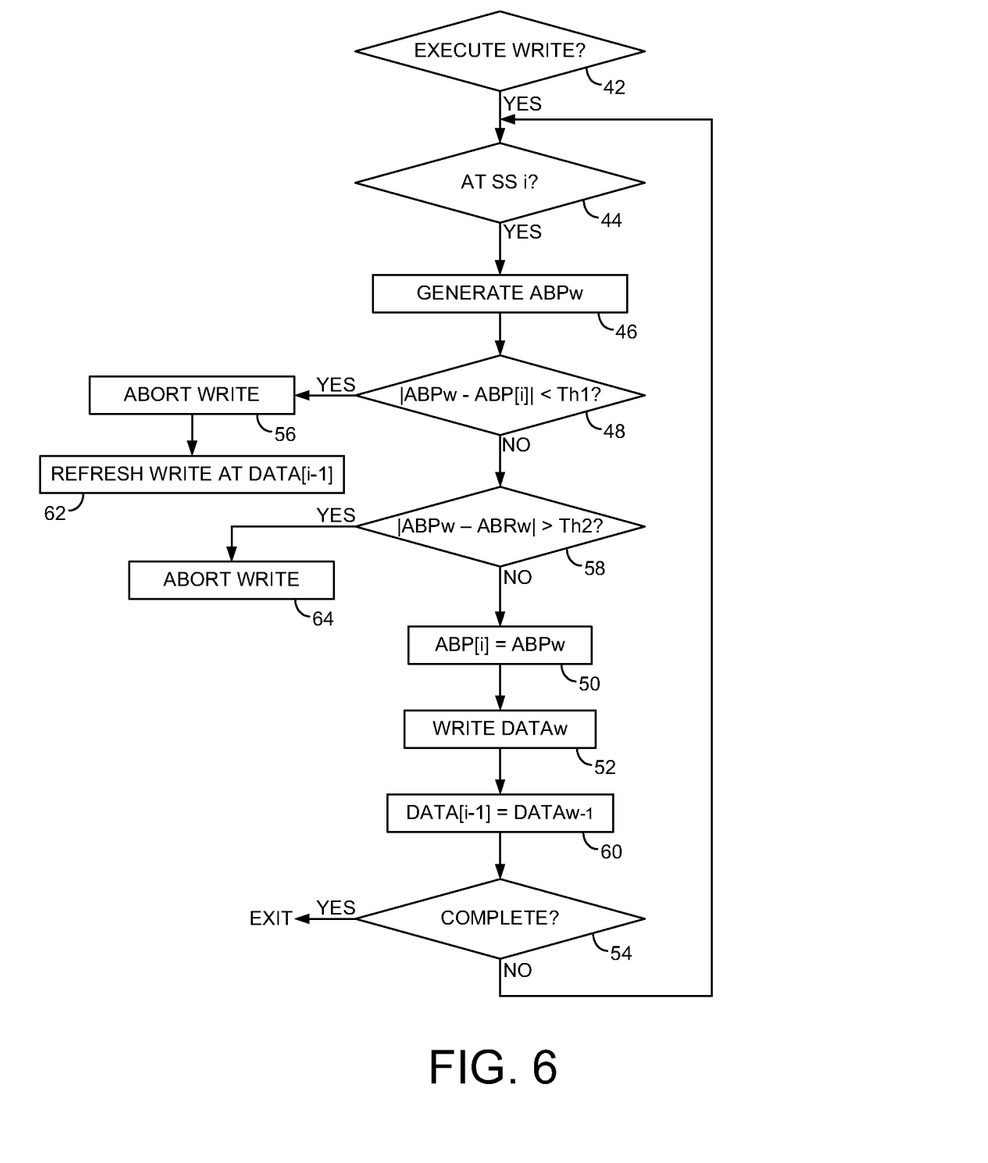
FIG. 6 is a flow diagram according to an embodiment wherein when an off-track write condition is detected, at least one data wedge of the previously written, adjacent track is rewritten.

FIG. 6 is a flow diagram illustrating this embodiment which extends on the flow diagram of FIG. 5, wherein when executing a write operation the write data written to a data wedge of the track is stored in a data buffer (block 60) similar to storing the absolute position information in the position buffer at block 50. When writing data to different data tracks, the write data overwrites the previously stored write data in the data buffer at block 60. Accordingly, the data buffer may store data wedges for different tracks, including for non-adjacent tracks. In this manner, when an off-track write condition is detected at block 48 based on the position buffer when writing to a current track, the write data stored in the data buffer may be used to refresh the data written to a previously written, adjacent track (block 62). When an off-track write condition is detected at block 58 based on the absolute reference position, the write operation is aborted (block 64) without refreshing a previously written, adjacent track since the data stored in the data buffer does not correspond to a previously written, adjacent track.

FIG. 8 illustrates an embodiment wherein the control circuitry may maintain a data buffer for each radial zone similar to maintaining a position buffer for each radial zone. Accordingly, if an off-track write condition is detected based on the position buffer for a radial zone, the corresponding data buffer may be used to refresh the data written in the previously written, adjacent track before retrying the current write operation to the current track.

Figure 7:
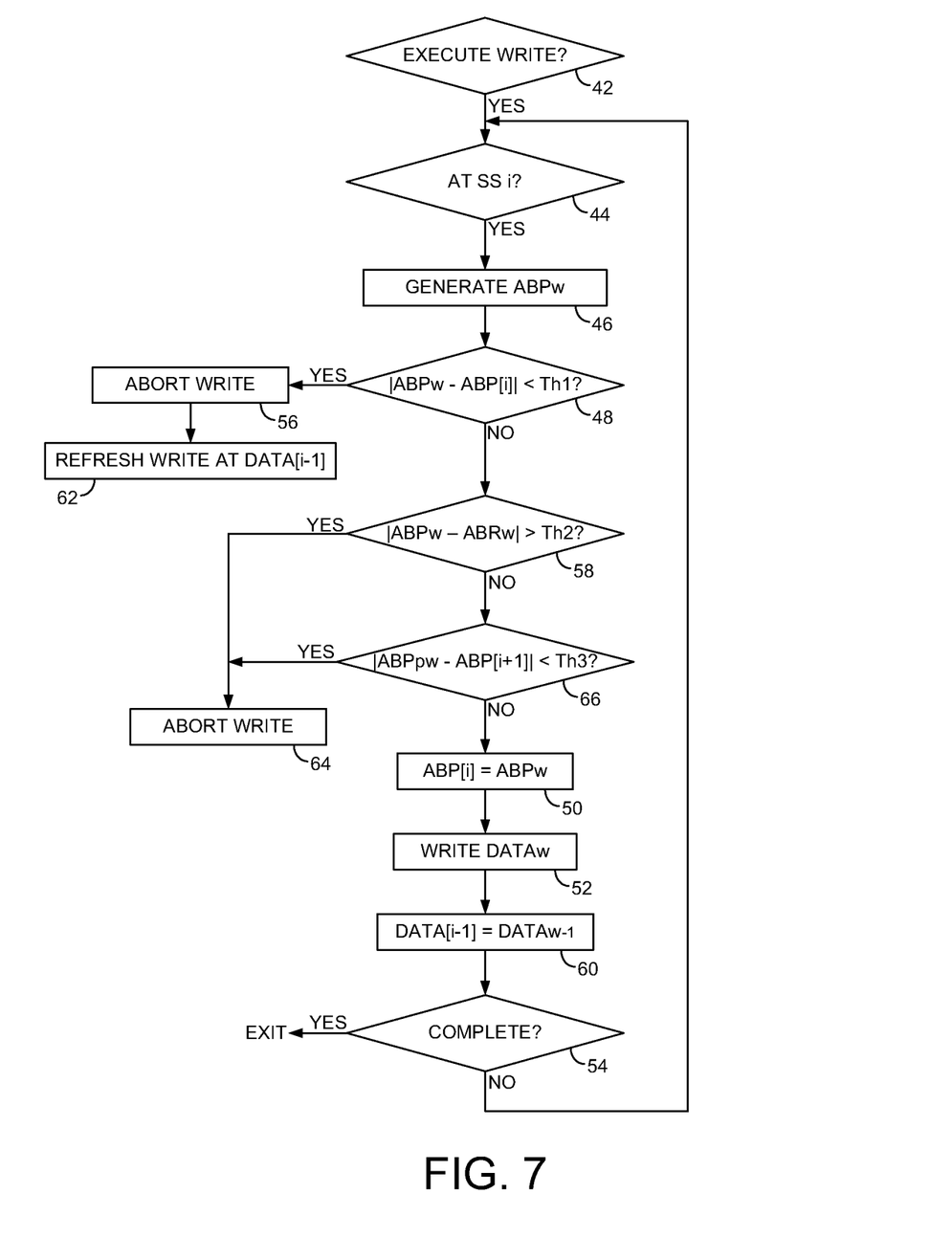
FIG. 7 is a flow diagram according to an embodiment wherein an off-track write condition may be predicted before it occurs.

FIG. 7 is a flow diagram illustrating an embodiment which extends on the flow diagram of FIG. 6, wherein when an off-track write condition is not detected at block 48 based on the position buffer, and an off-track write condition is not detected at block 58 based on the absolute reference position ABRw, an off-track write condition may still be predicted at block 66. In this embodiment, a predicted absolute position (ABPpw) corresponding to a next servo wedge is generated using any suitable algorithm. For example, in one embodiment the predicted absolute position is generated based on:

$$ABPpw(k)=2 \cdot ABPw(k)-ABPw(k-1)$$

If a difference between the ABPpw and the absolute position stored in the position buffer APB[i+1] for the next servo wedge exceeds a threshold at block 66, an off-track write condition is detected. In one embodiment, when an off-track write condition is detected based on the predicted absolute position of a next servo wedge, the write operation is aborted at block 64 without refreshing the data of the previously written, adjacent track.

Figure 9A:
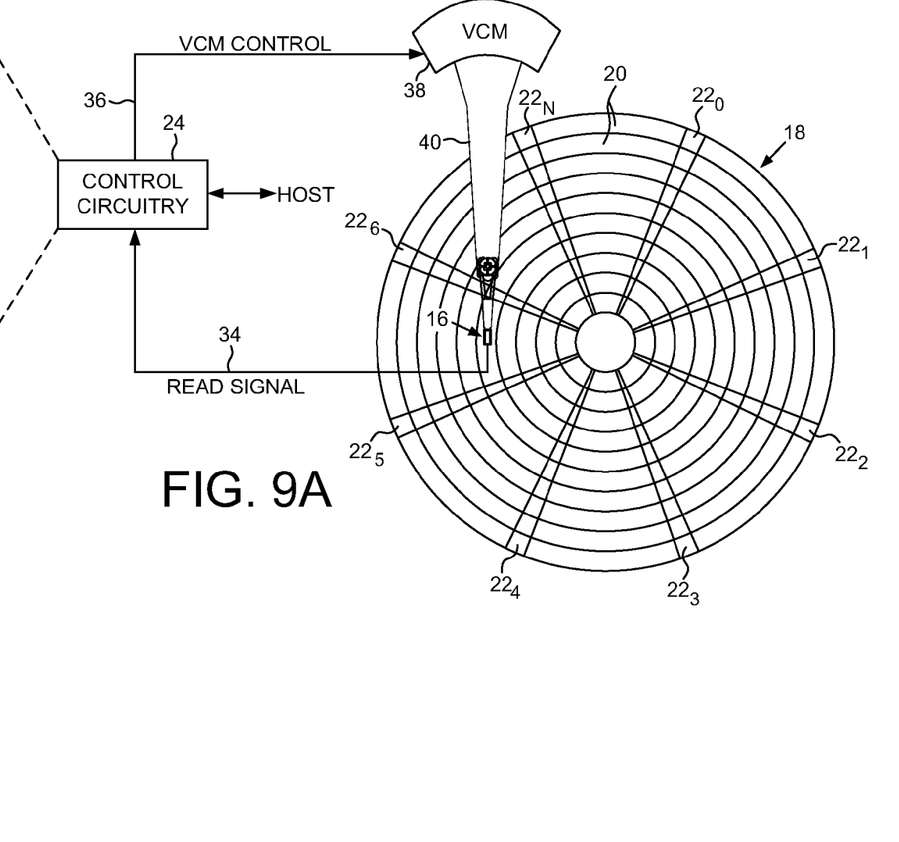
FIG. 9A shows a data storage device in the form of a disk drive according to an embodiment comprising a head actuated over a disk.
Figure 9B:
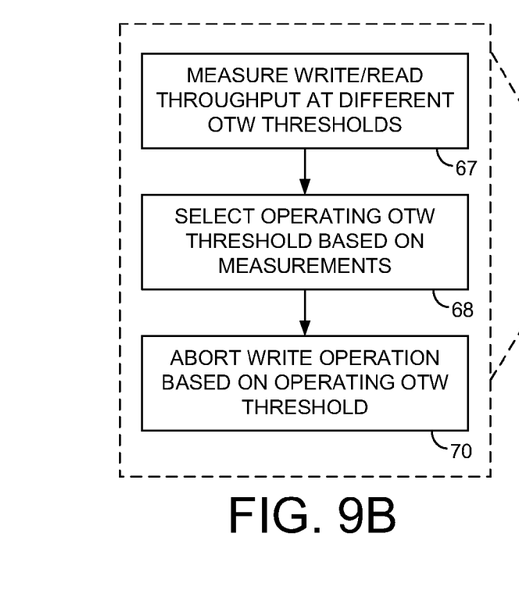
FIG. 9B is a flow diagram according to an embodiment wherein an off-track write threshold is selected based on a write throughput and a read throughput of the data storage device.

FIG. 9A shows a data storage device in the form of a disk drive according to an embodiment comprising a head 16 actuated over a disk 18, and control circuitry 24 configured to execute the flow diagram of FIG. 9B. A write throughput and a read throughput of the disk drive are measured for a plurality of different off-track write thresholds (block 67). An operating off-track write threshold is selected based on the measurements (block 68), and a write operation to the disk is aborted based on the operating off-track write threshold (block 70).

Figure 10:
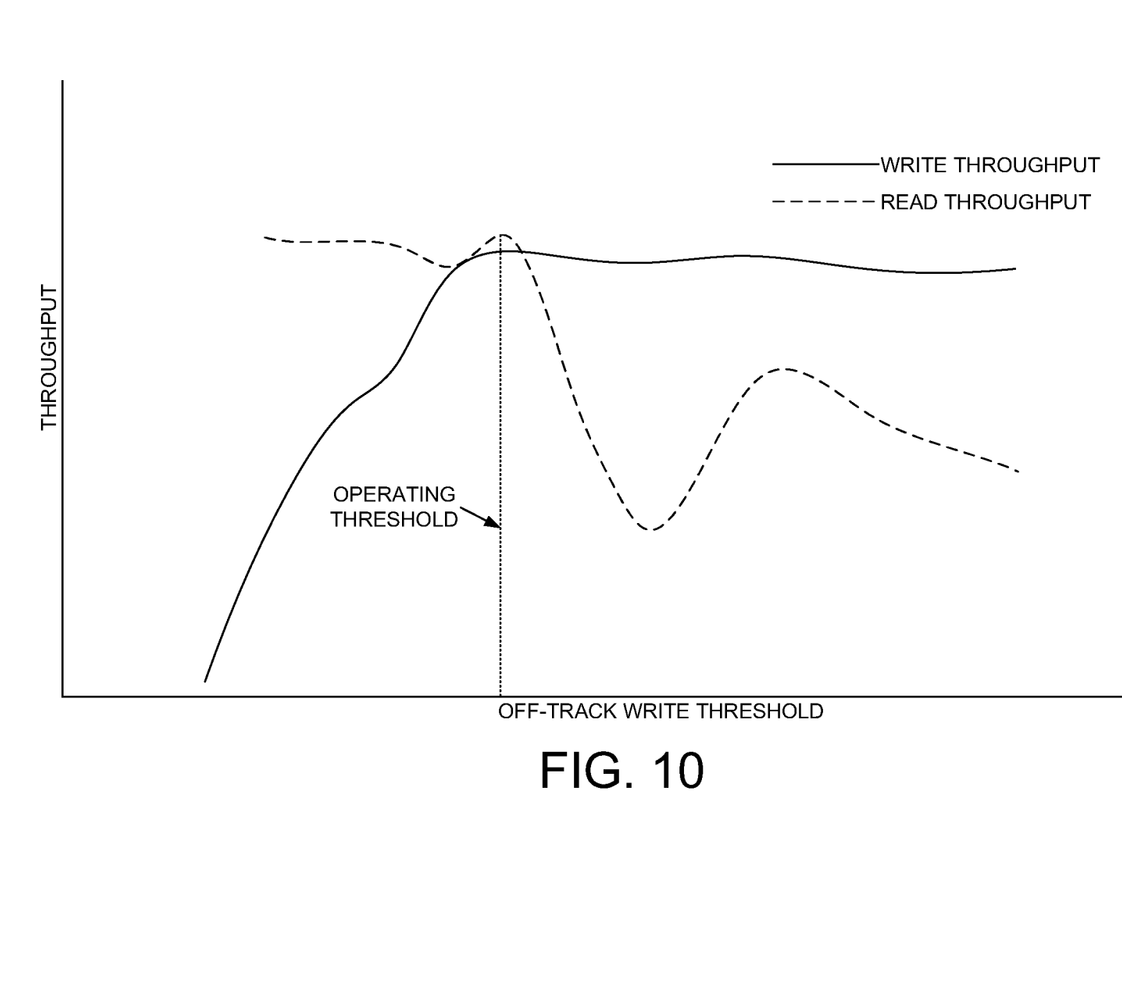
FIG. 10 illustrates an embodiment wherein the off-track write threshold is selected as the minimum of the measured off-track write thresholds that substantially maximizes the write throughput biased by a first weighting and the read throughput biased by a second weighting.

FIG. 10 shows an example of this embodiment wherein the write throughput of the disk drive increases as the off-track write threshold increases since there are fewer off-track write conditions detected and fewer write aborts. However, increasing the off-track write threshold eventually causes the read throughput of the disk drive to decrease since the reliability of the recorded data decreases which increases the data recovery time due, for example, to executing more retry reads and/or other heroic error recovery procedures. In one embodiment, the control circuitry 24 is configured to select the operating off-track write threshold that substantially maximizes the write throughput biased by a first weighting and the read throughput biased by a second weighting. For example, in one embodiment the control circuitry 24 is configured to select the operating off-track write threshold as the minimum of the measured off-track write thresholds that substantially maximizes the write throughput biased by a first weighting and the read throughput biased by a second weighting. Any suitable first weighting and second weighting may be selected to bias the write/read throughputs, for example, to achieve a target ratio between the write/read throughputs. For example, in one embodiment the first weighting may be different than the second weighting so that the disk drive exhibits better read throughput performance as compared to write throughput.

Any suitable operating off-track write threshold may be calibrated by executing the flow diagram of FIG. 9B, such as the position buffer threshold at block 48 of FIG. 7, the absolute reference position ABRw threshold at block 58 of FIG. 7, and/or the predictive threshold at block 66 of FIG. 7. In one embodiment, two or more off-track write thresholds may be calibrated relative to the write/read throughput of the disk drive.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
  a disk comprising a plurality of tracks defined by servo sectors, wherein each servo sector comprises a plurality of servo bursts and the servo sectors define a plurality of servo wedges;
  a head actuated over the disk; and
  control circuitry configured to:
    execute a first write operation to a first track and generate a first absolute position for the head corresponding to a first servo wedge;
    execute a second write operation to a second track and generate a second absolute position for the head corresponding to the first servo wedge; and
    detect an off-track write condition when executing the second write operation based on the first absolute position and the second absolute position;
    wherein the first absolute position comprises a track address of the first track and a position error measurement based on the servo bursts in the first servo wedge.

2. The data storage device as recited in claim 1, wherein the first absolute position comprises a head number representing the head.

3. The data storage device as recited in claim 1, wherein the control circuitry is further configured to abort the second write operation when the off-track write condition is detected.

4. The data storage device as recited in claim 1, wherein for a first radial zone of the disk comprising the first track and the second track the control circuitry is further configured to save an absolute position corresponding to each servo wedge, wherein at least one of the saved absolute positions corresponds to the first write operation and at least one of the saved absolute positions corresponds to the second write operation.

5. The data storage device as recited in claim 4, wherein at least one of the saved absolute positions corresponds to a third write operation to a third track non-adjacent to the first track.

6. The data storage device as recited in claim 4, wherein for a second radial zone of the disk comprising a third track and a fourth track, the control circuitry is further configured to save an absolute position corresponding to each servo wedge, wherein at least one of the saved absolute positions corresponds to a third write operation to the third track and at least one saved absolute positions corresponds to a fourth write operation to the fourth track.

7. A data storage device comprising:
  a disk comprising a plurality of tracks defined by servo sectors;
  a head actuated over the disk; and
  control circuitry configured to:
    define a first data buffer corresponding to a first circumference of the disk;
    execute a first write operation to write first write data to a first track and store the first write data to a first part of the first data buffer;
    execute a second write operation to write second write data to a second track and store at least part of the second write data to a second part of the first data buffer; and
    execute a third write operation to write third write data to a third track and store at least part of the third write data to a third part of the first data buffer;
    wherein:
      the first data buffer simultaneously stores at least part of the first write data, the second write data, and the third write data; and
      the third track is non-adjacent to the first track.

8. The data storage device as recited in claim 7, wherein the control circuitry is further configured to overwrite at least part of the first write data saved in the first data buffer with at least part of the third write data.

9. The data storage device as recited in claim 7, wherein the first circumference of the disk is within a first radial zone of the disk and the control circuitry is further configured to:
  define a second data buffer corresponding to a second circumference of the disk within a second radial zone of the disk; and
  save write data in the second data buffer for write operations to the tracks in the second radial zone.

10. The data storage device as recited in claim 7, wherein the control circuitry is further configured to:
  detect an off-track write condition when executing the second write operation; and
  when the off-track write condition is detected, rewrite at least part of the first write data saved in the first data buffer to the first track.

11. A data storage device comprising:
  a disk;

a head actuated over the disk; and control circuitry configured to:
- measure a write throughput and a read throughput for a plurality of different off-track write thresholds;
- select an operating off-track write threshold based on the measurements; and
- abort a write operation to the disk based on the operating off-track write threshold.

12. The data storage device as recited in claim 11, wherein the control circuitry is further configured to select the operating off-track write threshold that substantially maximizes the write throughput biased by a first weighting and the read throughput biased by a second weighting.

13. The data storage device as recited in claim 11, wherein the control circuitry is further configured to select the operating off-track write threshold as the minimum of the measured off-track write thresholds that substantially maximizes the write throughput biased by a first weighting and the read throughput biased by a second weighting.

14. The data storage device as recited in claim 11, wherein:
- the write throughput increases when the off-track write threshold increases; and
- the read throughput decreases when the off-track write threshold increases.

15. A method of operating a data storage device, the method comprising:
- executing a first write operation to a first track on a disk using a head and generating a first absolute position for the head corresponding to a first servo wedge on the disk;
- executing a second write operation to a second track and generating a second absolute position for the head corresponding to the first servo wedge; and
- detecting an off-track write condition when executing the second write operation based on the first absolute position and the second absolute position;
- wherein the first absolute position comprises a track address of the first track and a position error measurement based on servo bursts in the first servo wedge.

16. The method as recited in claim 15, wherein the first absolute position comprises a head number representing the head.

17. The method as recited in claim 15, wherein the method further comprises aborting the second write operation when the off-track write condition is detected.

18. The method as recited in claim 15, wherein for a first radial zone of the disk comprising the first track and the second track the method further comprises saving an absolute position corresponding to each servo wedge, wherein at least one of the saved absolute positions corresponds to the first write operation and at least one of the saved absolute positions corresponds to the second write operation.

19. The method as recited in claim 18, wherein at least one of the saved absolute positions corresponds to a third write operation to a third track non-adjacent to the first track.

20. The method as recited in claim 18, further comprising, for a second radial zone of the disk comprising a third track and a fourth track, saving an absolute position corresponding to each servo wedge, wherein at least one of the saved absolute positions corresponds to a third write operation to the third track and at least one saved absolute positions corresponds to a fourth write operation to the fourth track.

21. A method of operating a data storage device, the method comprising:
- defining a first data buffer corresponding to a first circumference of a disk;
- executing a first write operation to write first write data to a first track on the disk and storing the first write data to a first part of the first data buffer;
- executing a second write operation to write second write data to a second track on the disk and storing at least part of the second write data to a second part of the first data buffer; and
- executing a third write operation to write third write data to a third track on the disk and store at least part of the third write data to a third part of the first data buffer;
- wherein:
  - the first data buffer simultaneously stores at least part of the first write data, the second write data, and the third write data; and
  - the third track is non-adjacent to the first track.

22. The method as recited in claim 21, further comprising overwriting at least part of the first write data saved in the first data buffer with at least part of the third write data.

23. The method as recited in claim 21, wherein the first circumference of the disk is within a first radial zone of the disk and the method further comprises:
- defining a second data buffer corresponding to a second circumference of the disk within a second radial zone of the disk; and
- saving write data in the second data buffer for write operations to the tracks in the second radial zone.

24. The method as recited in claim 21, further comprising:
- detecting an off-track write condition when executing the second write operation; and
- when the off-track write condition is detected, rewriting at least part of the first write data saved in the first data buffer to the first track.

25. A method of operating a data storage device, the method comprising:
- measuring a write throughput and a read throughput for a plurality of different off-track write thresholds;
- selecting an operating off-track write threshold based on the measurements; and
- aborting a write operation to a disk based on the operating off-track write threshold.

26. The method as recited in claim 25, further comprising selecting the operating off-track write threshold that substantially maximizes the write throughput biased by a first weighting and the read throughput biased by a second weighting.

27. The method as recited in claim 25, further comprising selecting the operating off-track write threshold as the minimum of the measured off-track write thresholds that substantially maximizes the write throughput biased by a first weighting and the read throughput biased by a second weighting.

28. The method recited in claim 25, wherein:
- the write throughput increases when the off-track write threshold increases; and
- the read throughput decreases when the off-track write threshold increases.

* * * * *